United States Patent [19]
Morita

[11] Patent Number: 5,240,314
[45] Date of Patent: Aug. 31, 1993

[54] HYDRAULIC BRAKE SYSTEM

[75] Inventor: Koji Morita, Kanagawa, Japan

[73] Assignee: Nissan Motor Co., Ltd., Yokohama, Japan

[21] Appl. No.: 759,905

[22] Filed: Sep. 13, 1991

[30] Foreign Application Priority Data

Oct. 2, 1990 [JP] Japan .................... 2-264516

[51] Int. Cl.$^5$ .................... B60T 8/34; B60T 8/48
[52] U.S. Cl. .................... 303/117.1; 303/113.2; 303/116.1; 303/119.2; 137/529
[58] Field of Search .................... 303/84.2, 92, 116 R, 303/116 SP, 113 TR, 117, 113.2, 116.1, 116.2, 119.2, 117.1; 137/529

[56] References Cited

U.S. PATENT DOCUMENTS

| | | | |
|---|---|---|---|
| 4,556,260 | 12/1985 | Maehara | 303/116 SP |
| 4,627,671 | 12/1986 | Matsui et al. | 303/116.2 |
| 4,834,469 | 5/1989 | Kohno et al. | 303/116 R |
| 4,878,715 | 11/1989 | Toda | 303/116.1 |
| 4,915,459 | 4/1990 | Hashida et al. | 303/117 X |
| 4,938,541 | 7/1990 | Shaw et al. | 303/117 X |
| 5,026,127 | 6/1991 | Arikawa | 303/116 R |
| 5,039,176 | 8/1991 | Hellmann et al. | 303/116 RX |

FOREIGN PATENT DOCUMENTS

| | | | |
|---|---|---|---|
| 2226189 | 12/1973 | Fed. Rep. of Germany | 137/529 |
| 3743588 | 8/1988 | Fed. Rep. of Germany | 303/116 SP |
| 0078873 | 6/1980 | Japan | 137/529 |
| 61-108041 | 5/1986 | Japan | |
| 61-287852 | 12/1986 | Japan | |
| 63-53156 | 3/1988 | Japan | 303/119.2 |
| 1295424 | 11/1972 | United Kingdom | 303/117 |
| 2026248 | 1/1980 | United Kingdom | 303/119.2 |
| 2130668 | 6/1984 | United Kingdom | 303/117 |

Primary Examiner—Robert J. Oberleitner
Assistant Examiner—Peter M. Poon
Attorney, Agent, or Firm—Foley & Lardner

[57] ABSTRACT

A hydraulic brake system for a vehicle includes a cutoff valve for isolating a hydraulic modulator for anti lock brake control and traction control, from a brake master cylinder. This cutoff valve is so arranged that the master cylinder fluid pressure forces the cutoff valve to its open state even if the valve is stuck in its closed state by a failure of the system.

9 Claims, 2 Drawing Sheets

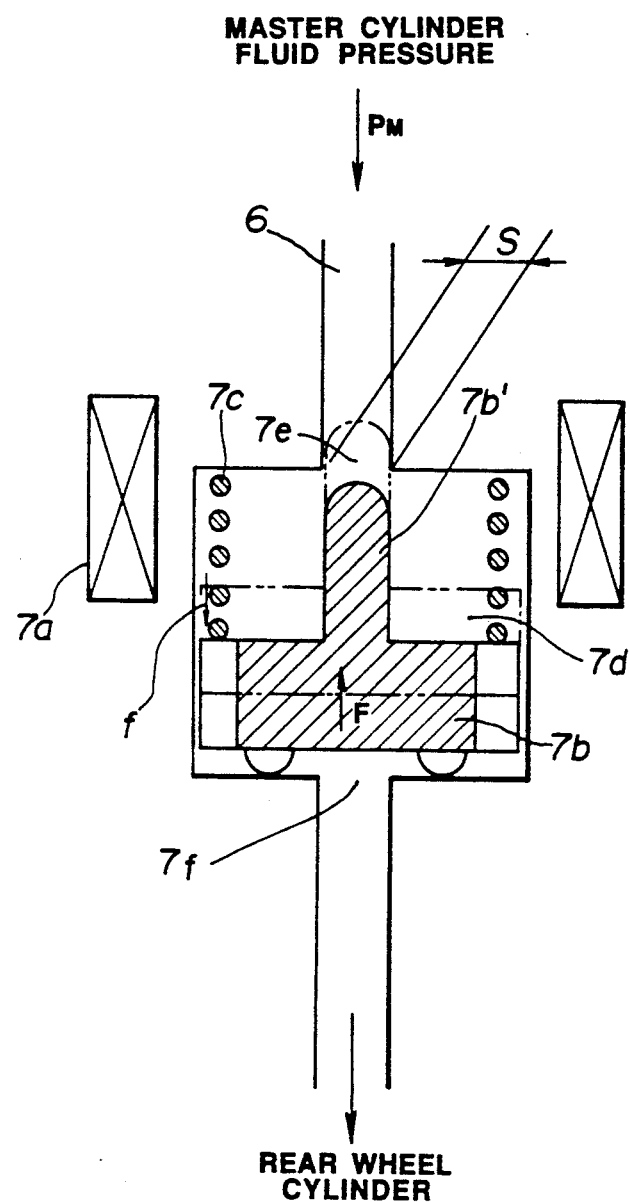

5,240,314

HYDRAULIC BRAKE SYSTEM

BACKGROUND OF THE INVENTION

The present invention relates to hydraulic brake systems for vehicles such as passenger cars.

Japanese Patent Provisional (KOKAI) Publications Nos. 61-108041 and 61-287852 disclose conventional brake systems. These conventional system have a cutoff valve for cutting off the fluid communication between a brake master cylinder and a hydraulic modulator for anti lock control and traction control, to enable the modulator to control the brake fluid pressure independently of the master cylinder fluid pressure. This cutoff valve has a solenoid which produces a force to close the valve when energized, and a return spring producing a force to open the valve when the solenoid is deenergized. Therefore, if the solenoid is kept energized because of a failure in the electric system, then the cutoff valve continues to be closed, and deteriorates the brake effectiveness and the safety of the vehicle.

SUMMARY OF THE INVENTION

It is an object of the present invention to provide a hydraulic brake system which can improve the safety of a vehicle.

According to the present invention, a hydraulic brake system comprises a primary unit, such as a brake master cylinder, for producing a primary fluid pressure, an actuating system for normally receiving the primary fluid pressure and converting the fluid pressure into a brake actuation force, and a first cutoff valve connected between the primary unit and the actuating system. The cutoff valve according to the present invention comprises a valve element, such as a spool. The valve element receives a force which is produced by the primary fluid pressure, and which acts in a direction to open the cutoff valve. Therefore, it is possible to open the cutoff valve by increasing the primary fluid pressure.

BRIEF DESCRIPTION OF THE DRAWINGS

FIG. 2 is a sectional view of a solenoid cutoff valve according to the embodiment of the invention.

DETAILED DESCRIPTION OF THE INVENTION

Figure 1:
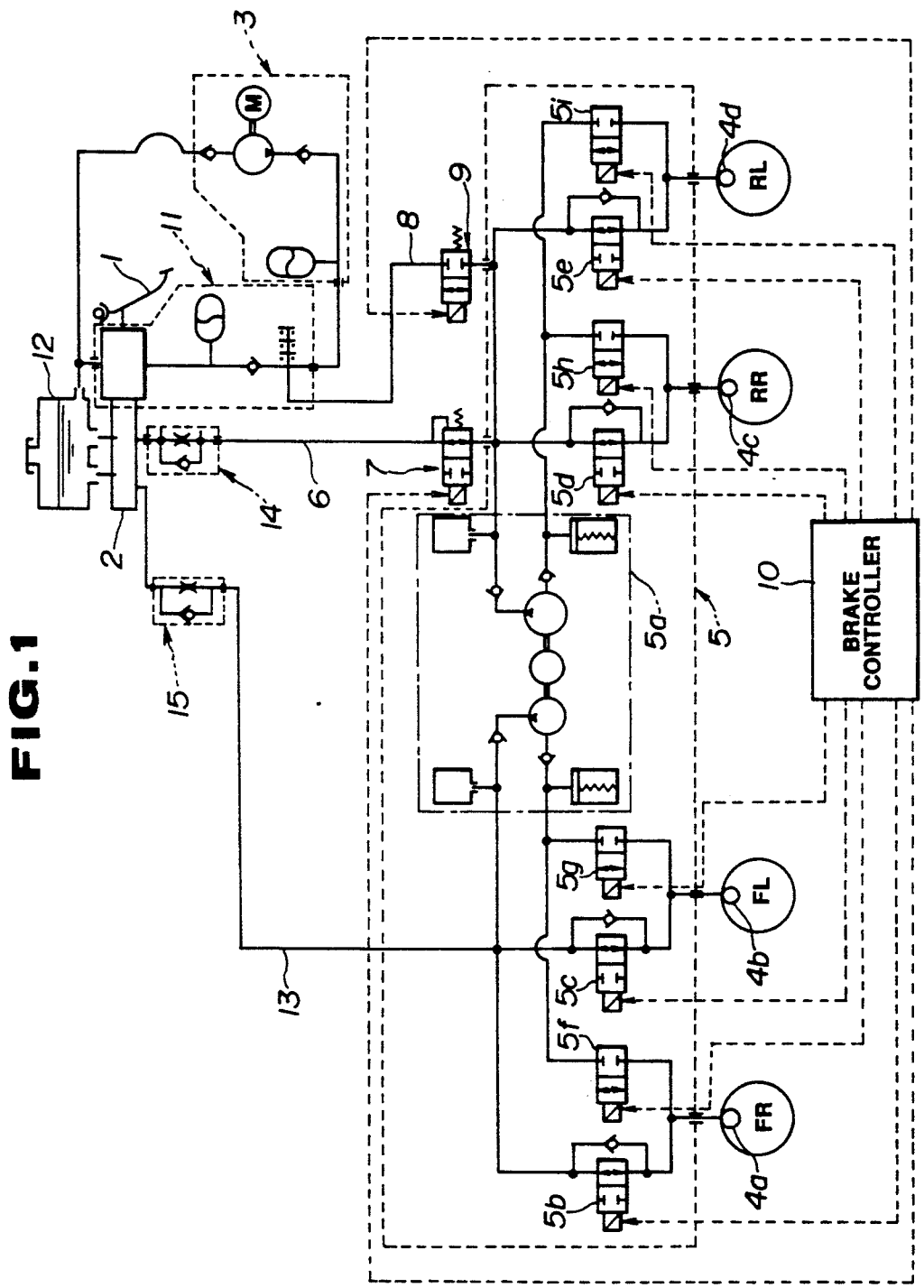
FIG. 1 is a schematic view showing a hydraulic brake system according to one embodiment of the present invention.

One embodiment of the present invention is shown in FIGS. 1 and 2.

A hydraulic brake system shown in FIG. 1 is provided in a rear wheel drive vehicle having left and right front wheels, and left and right rear drive wheels.

The brake system of this embodiment includes a brake pedal 1, a master cylinder (primary unit) 2, an external pressure source (secondary unit) 3, right and left front wheel brake cylinders 4a and 4b, right and left rear wheel brake cylinders 4c and 4d, and an ABS & TCS hydraulic modulating system (or ABS & TCS actuator or modulator) 5. The master cylinder 2 is a primary unit for producing a primary fluid pressure (master cylinder fluid pressure) PM by receiving a force from the brake pedal 1. The external pressure source 3 produces a secondary fluid pressure (external fluid pressure) independently of the brake pedal input effort of the driver. The external pressure source 3 of this embodiment comprises a pump driven by a motor. Each wheel cylinder is a hydraulic actuator for converting hydraulic fluid pressure into a mechanical brake actuation force. The ABS & TCS modulating system (or subsystem) 5 is connected between the master cylinder 2, and the group of the wheel cylinders 4a, 4b, 4c and 4d.

The brake system further includes a first rear brake fluid passage 6 connecting the master cylinder (primary unit) 2 and the modulating system 5, a first cutoff valve 7 disposed in this fluid passage 6, a second brake fluid passage 8 connecting the external pressure source (secondary unit) 3 and the modulating system 5, and a second cutoff valve 9 disposed in the second passage 8. The first cutoff valve 7 is arranged to open and close the first fluid passage 6, and the second cutoff valve 9 is arranged to open and close the second fluid passage 8.

The brake system further includes a brake controller 10 serving as a selecting means for selecting the primary fluid pressure PM of the master cylinder 2 by opening the first cutoff valve 7 and closing the second cutoff valve 9, and selecting the secondary fluid pressure of the external pressure source 3 by closing the first cutoff valve 7 and opening the second cutoff valve 9.

Between the brake pedal 1 and the master cylinder 2, there is provided a hydraulic brake booster 11 for multiplying a pedal force. A brake fluid reservoir 12 is connected with both of the master cylinder (primary unit) 2 and the external pressure source (secondary unit) 3. The master cylinder 2 and the external pressure source 3 use the reservoir 12 in common.

The modulating system 5 is connected with the master cylinder 2 by the first rear brake fluid passage 6, and a first front brake fluid passage 13. A dual pass unit 14 is provided in the first rear brake fluid passage 6 between the master cylinder 2 and the first cutoff valve 7. Another dual pass unit 15 is provided in the first front brake fluid passage 13. The dual pass units 14 and 15 function to suppress variation of the pedal force of the brake pedal 1 during an anti lock brake control of the ABS & TCS modulating system 5.

The ABS & TCS modulating system 5 is designed to perform both of an anti lock brake control for all the four wheels, and a traction control for the rear (drive) wheels. The modulating system 5 includes an internal fluid pressure source 5a, and four valve pairs each consisting of a pressure increasing valve 5b, 5c, 5d or 5e for increasing and holding a fluid pressure, and a pressure reducing valve 5f, 5g, 5h or 5i for reducing and holding a fluid pressure. Each valve pair is connected with a unique one of the four wheel cylinders 4a, 4b, 4c and 4d. The internal fluid pressure source 5a is a unit for producing a fluid pressure used for a pressure increasing mode of the anti lock brake control.

As shown in FIG. 2, the first cutoff valve 7 of this embodiment includes a valve solenoid (active element) 7a, a valve spool (valve element) 7b, a return spring 7c and a valve housing defining a spool chamber 7d having an inlet port 7e and an outlet port 7f. The spool 7b is arranged in a direction of a flow line in the first rear fluid passage 6. The return spring 7c is disposed so as to apply a biasing force on the spool 7b in an opening direction to open the first cutoff valve 7. The spool 7b has a projecting portion 7b' which projects from a main portion of the spool 7b and which is smaller in sectional size than the main portion of the spool 7b. The spool 7b is movable along a straight line between an opening position shown by a solid line in FIG. 2, and a closing position shown by a one dot chain line. When the spool 7b is in the closing position shown by the one dot chain line, the projecting portion 7b' of the spool 7b is fit in the inlet port 7e, and closes the inlet port 7e. In this embodiment, the inlet port 7e serves as a valve seat. The straight line along which the spool 7b is movable is parallel to (or coincident with) the line of flow of the fluid in the first rear fluid passage 6. The spool 7b must move in the upstream direction, against the stream from the master cylinder 2 in order to reach the closing position. In this embodiment, the solenoid 7a serves as the active element of the first cutoff valve 7 by moving the movable valve element to open and close the inlet port 7e when the solenoid is deenergized and energized, respectively, and the movable valve element is in the form of the spool 7b.

The brake controller 10 is a controlling means for receiving signals from wheel speed sensors (not shown) and controlling the solenoid valves 5b-5i, 7 and 9. The controller 10 of this embodiment has a pressure source selecting section, an anti lock control section and a traction control section. The selecting section selects one of the primary fluid pressure PM of the master cylinder 2 and the secondary fluid pressure of the external pressure source 3 by controlling the first and second cutoff valves 7 and 9. The function of the anti lock control section is to improve braking performance during heavy braking or braking on a low μ road surface by preventing wheel lock of each of the four wheels. The function of the traction control section is to restrain slip of the drive (rear) wheels during starting or heavy acceleration.

The brake system of this embodiment can improve the safety of the vehicle as follows:

If at least one of the four wheels falls in a condition leading to wheel lock, the brake controller 10 controls the wheel cylinder brake fluid pressure PW for each individual wheel in accordance with the slip condition of each wheel, by sending control signals to the solenoid valves 5b-5i, and thereby prevents wheel lock-up and vehicle skidding. During this anti lock control operation, the wheel cylinder fluid pressure PW of each wheel is controlled according to one of three modes, which are pressure increasing mode, pressure holding mode and pressure reducing mode. The brake controller 10 selects the primary fluid pressure PM of the master cylinder 2 by opening the first cutoff valve 7 and closing the second cutoff valve 9 as shown in FIG. 1 except when the traction control is required.

When the degree of a drive wheel slip becomes higher than a predetermined level during starting or rapid acceleration, then the brake controller 10 brings the first cutoff valve 7 from the open state to the closed state, and the second cutoff valve 9 from the closed state to the open state in order to select the second fluid pressure of the external pressure source 3 instead of the primary pressure PM. Then, the controller 10 sends control signals to the solenoid valves 5d-5i for the rear wheels, and controls the brake fluid pressure of each of the rear wheel brake cylinders 4c and 4d according to one of the increasing, holding and reducing modes in dependence on the drive wheel slip condition, to restrain the drive wheel slip.

If the valve solenoid 7a of the first solenoid cutoff valve 7 is continuously held in the energized state because of some fault such as a short circuit, then the first cutoff valve 7 is uncontrollably kept in the closed state, and becomes immovable from the closed state. Therefore, although the primary fluid pressure PM of the master cylinder 2 is supplied to the front brake circuit, the first cutoff valve 7 cuts off the supply of the primary fluid pressure PM to the rear brake circuit.

However, the first cutoff valve 7 of the invention enables the supply of the primary pressure from the master cylinder 2 to the rear brake circuit again. In FIG. 2, "F" is the force applied on the spool 7b by the energized solenoid 7a, and "f" is the biasing force applied by the return spring 7c on the spool 7b. The primary fluid pressure PM acts on the projecting portion 7b' of the spool 7b in the closing position. The force due to the primary fluid pressure PM has a magnitude which is equal to a product resulting from multiplication of the primary fluid pressure and a pressure receiving area S of the projecting portion 7b', and a direction opposing the force F of the solenoid 7a. Therefore, when the sum of the force due to the primary pressure PM and the biasing force f of the return spring 7c exceeds the force F of the solenoid 7a, then the valve spool 7b moves from the closing position shown by the one dot chain line in FIG. 2 to the opening position of the solid line, and opens the inlet port 7e. Thus, when the condition expressed by PM.S+f>F is satisfied, the first cutoff valve 7 is forcibly opened, and the primary fluid pressure PM is supplied from the master cylinder 2 to the rear wheel cylinders 4c and 4d. This hydraulic brake system enables the driver to slow the vehicle effectively by the action of both the front brake circuit and the rear brake circuit, and ensures the safety of the vehicle even if the first cutoff valve 7 fails.

In the illustrated embodiment, the first cutoff valve 7 is connected between the master cylinder (primary unit) 2 and the brake actuating system which comprises the rear wheel brake cylinders 4c and 4d, and the modulating system 5.

What is claimed is:

1. A hydraulic brake system comprising;
   a primary unit for producing a primary fluid pressure;
   an actuating system which normally receives said primary fluid pressure and produces a brake actuation force; and
   a first cutoff valve for closing a first fluid passage connecting said primary unit and said actuating system to isolate said actuating system from said primary unit, said first cutoff valve comprising a valve element which receives a first force which is exerted by said primary fluid pressure, said first force acting in a direction to open said first fluid passage;
   wherein said first cutoff valve further comprises an active element which applies a second force on said valve element
   and which includes a solenoid for causing said valve element to move to a first position to open said first fluid passage when said solenoid is deenergized and to a second closing position to close said first fluid passage when said solenoid is energized;
   wherein said first cutoff valve further comprises a return spring applying a third force on said valve element in a direction to move said valve element to an opening position to open said first fluid passage;
   wherein said first cutoff valve further comprises a valve housing defining a spool chamber having an inlet port for receiving said primary pressure from said primary unit, and an outlet port for delivering said primary pressure to said actuating system, and said valve element is in a form of a spool which is received in said spool chamber, and closes said inlet port when said spool is in said closing position; and wherein said spool comprises a main portion and a projecting portion which projects from said main portion and which is smaller in sectional size than said main portion, said projecting portion being fit in said inlet port when said spool is in said closing position.

2. A hydraulic brake system according to claim 1 wherein said primary unit is in a form of a brake master cylinder, and said actuating system comprises a wheel brake cylinder for applying said brake actuation force on a wheel of a vechicle.

3. A hydraulic brake system according to claim 2 wherein said actuating system further comprises a hydraulic modulating system for varying a wheel cylinder fluid pressure supplied to said wheel cylinder independently of said primary pressure when said actuating system is isolated from said primary unit by said first cutoff valve.

4. A hydraulic brake system according to claim 3 further comprising a secondary unit for producing a secondary fluid pressure, and a second cutoff valve for opening and closing a second fluid passage connecting said secondary unit and said actuating system.

5. A hydraulic brake system according to claim 4 wherein said brake system further comprises a controller for selecting said primary fluid pressure of said primary unit by opening said first cutoff valve and closing said second cutoff valve, and selecting said secondary fluid pressure by closing said first cutoff valve and opening said second cutoff valve.

6. A hydraulic brake system according to claim 5 wherein said secondary unit comprises a pump.

7. A hydraulic brake system according to claim 1 wherein said spool is placed between said inlet and outlet ports, and is movable along an imaginary straight line passing through both of said inlet and outlet ports.

8. A hydraulic brake system according to claim 1 wherein said spool is solid, and said valve housing and said spool define a fluid passage which is formed between an inside surface of said valve housing and an outside surface of said spool and which allows passage of a fluid when said spool is held in said opening position by said return spring.

9. A hydraulic brake system according to claim 1 wherein said solenoid produces the second force by pulling said valve element toward a closing position to close said first fluid passage when said solenoid is energized, said valve element comprises a pressure receiving portion which receives said first force when said valve element is in said closing position, said valve element being held in said closing position when a sum of said first force and said third force is smaller than said second force and being moved away from said closing position by said first and second forces when said primary pressure increases so that the sum of said first and third forces becomes greater than said second force.

* * * * *